United States Patent [19]

Dillman

[11] 4,261,679
[45] Apr. 14, 1981

[54] CLEAN-OUT FOR ASPHALT MIX BUCKET ELEVATOR

[75] Inventor: Bruce A. Dillman, Prairie du Chien, Wis.

[73] Assignee: Bituma-Stor, Inc., Marquette, Iowa

[21] Appl. No.: 48,529

[22] Filed: Jun. 13, 1979

[51] Int. Cl.³ .............................................. B65G 45/00
[52] U.S. Cl. .................................... 414/299; 198/494; 222/149
[58] Field of Search .............. 414/293, 299, 325, 327; 222/149, 409; 198/494, 498, 701, 703, 716, 861

[56] References Cited

U.S. PATENT DOCUMENTS

| 2,552,812 | 5/1951 | Patterson | 198/494 X |
| 3,378,171 | 4/1968 | Eaton | 198/716 X |

Primary Examiner—Robert G. Sheridan
Attorney, Agent, or Firm—James E. Nilles; James R. Custin

[57] ABSTRACT

An automatic clean-out for the charging bin of an asphalt mix bucket elevator provides for removal of material from the bottom of the charging bin so that hardened asphalt mix will not interfere with operation of moving elevator parts upon subsequent restarting. The clean-out device comprises a pusher having an upright front surface and a flat top surface, with a length and width to overlie substantially the whole bottom area of the charging bin. The pusher is actuated forwardly and rearwardly by a double-acting pressure fluid cylinder jack mounted behind it. In moving forward, the pusher expels mix from the bottom of the charging bin through a front opening therein. It is rearwardly withdrawn through a closely fitting opening so that asphalt mix resting on its top is scraped off to remain in the charging bin.

6 Claims, 6 Drawing Figures

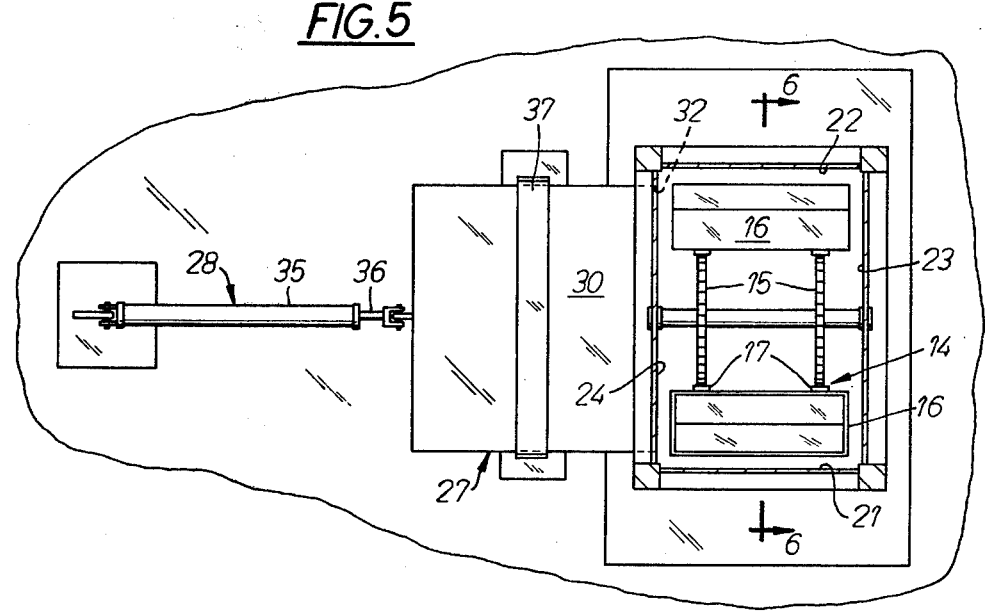
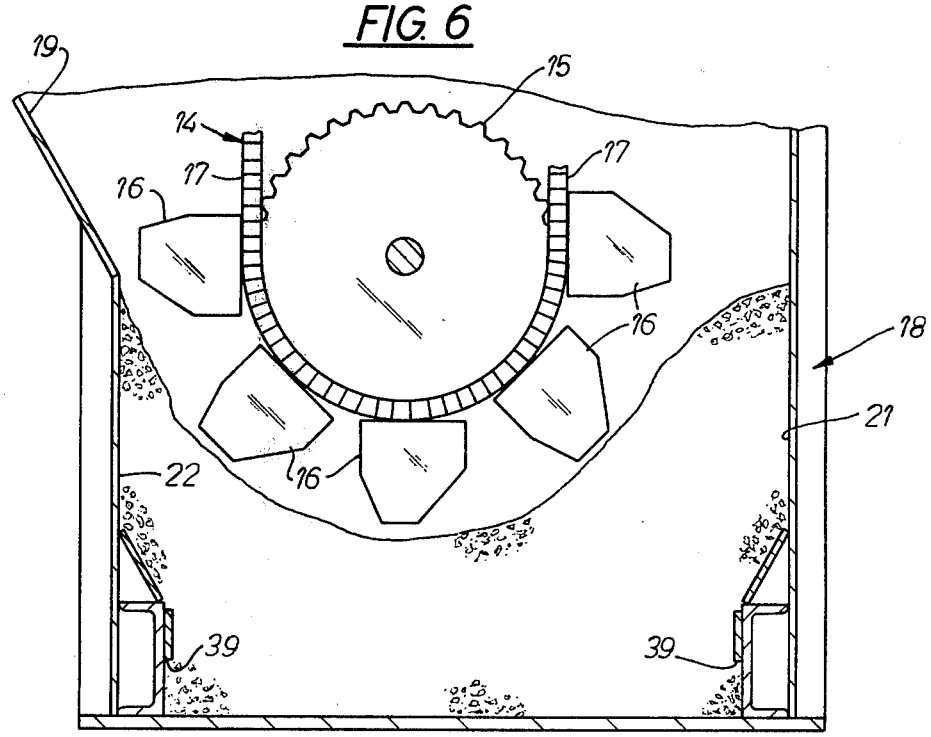

CLEAN-OUT FOR ASPHALT MIX BUCKET ELEVATOR

FIELD OF THE INVENTION

This invention relates generally to asphalt mix storage apparatus comprising a bucket elevator, by which asphalt mix is lifted to a level from which it can be filled into an inlet in the top of an elevated, silo-like storage bin; and the invention is more particularily concerned with means in such apparatus for enabling the bucket elevator to be restarted without interference from hardened asphalt mix after it has been shut down for a time.

BACKGROUND OF THE PRIOR ART

In a plant in which asphalt concrete mix is prepared, the hot asphalt mix is temporarily stored in a thermally insulated silo-like storage bin so that it can be hauled to the site of use as and when it is needed, independently of the rate at which it is mixed. The storage bin has a bottom outlet and is elevated high enough above ground level so that trucks can be driven under it to be loaded by gravity flow. The inlet to the storage bin is at its top, and therefore the freshly prepared asphalt mix must be carried up to the storage bin inlet by means of an elevator.

In older asphalt mix plants the elevator used for filling the storage bin was usually an inclined slat conveyor, but most plants constructed during the past several years have had a bucket elevator which extends straight up alongside the storage bin and which occupies less space than a slat conveyor.

A bucket elevator comprises a drive chain or similar endless carrier to which buckets are fastened at intervals. The carrier is trained around sprockets that drive it and dispose it in a pair of vertical stretches, along one of which the buckets move downwardly and along the other of which they move upwardly. In the bottom portion of their orbit the buckets pass through a charging bin in which they scoop up asphalt mix that is to be carried up to the storage bin inlet. The charging bin, which is also known as the "boot" of the bucket elevator, receives asphalt mix directly from the pug mill or drum mixer in which it is mixed.

One disadvantage of a bucket elevator is that its charging bin must be cleaned out to some extent at the end of each day's operations, when the bucket elevator is shut down. Hardened asphalt mix in contact with the buckets and/or the endless carrier would strongly resist movement of those parts upon restarting of the bucket elevator and could damage or destroy the chain, the buckets, the bottom sprocket assembly, or even the power train that drives the elevator. To ensure free movement of the bucket elevator parts upon restarting, all material has to be removed from between the buckets and the side walls of the charging bin. The bottom of the charging bin need not be cleaned out completely, but a substantial amount of mix must be removed from beneath the buckets because the chain tension take-ups on a bucket elevator are on its lower portion, and any material left in the bin should be clear of the lowermost buckets and the chain portion that carries them in the event they move down to their lowest level.

Heretofore such clean-out of the charging bin has been done manually, with shovels, through clean-out doors in its bottom. Although manual clean-out was difficult, unpleasant and time consuming, the use of any type of mechanized scoop (front end loader or the like) seemed to be out of the question because of the confined spaces from which the mix had to be removed.

Because manual clean-out is onerous work, it has not always been done at the end of every operating day, and the consequences of the failure or neglect were usually costly.

The object of the present invention is to provide simple and inexpensive automatic means in asphalt mix storage apparatus for preventing asphalt mix in the charging bin from interfering with operation of the carrier and buckets of the bucket elevator when that elevator is restarted after being shut down long enough for the asphalt mix to harden.

More specifically, it is an object of this invention to provide simple and effective automatic means for removing asphalt mix from the bottom portion of the charging bin and shifting the removed mix to a location from which it can be readily picked up by an end loader or the like, so that manual shoveling of asphalt mix out of the charging bin is unnecessary.

Thus an ultimate object of the invention is to eliminate an important cause of difficulties, malfunctions and breakdowns in bucket elevators associated with asphalt mix storage apparatus, while at the same time eliminating the need for laborious, unpleasant and time-consuming manual clean-out of the charging bin of such an elevator after each daily shut-down.

SUMMARY OF THE INVENTION

In general the invention resides in novel clean-out means for the charging bin of asphalt mix storage apparatus wherein asphalt mix is initially received and from which it is carried up to the inlet of a storage bin by means of a bucket elevator that comprises an endless carrier upon which there are buckets and means for causing the carrier to move in an orbit such that the buckets are carried through the charging bin to scoop asphalt therefrom and then move upwardly, said clean-out means providing for removal of asphalt mix from the charging bin upon shutdown of the elevator so that hardened asphalt mix in the charging bin will not interfere with operation of the elevator upon its subsequent restarting, said clean-out means comprising: a pusher that has a substantially upright front pushing surface, a top surface which extends rearwardly from said front surface and which is at a height to pass readily under the carrier and buckets, and a length and width to extend across a substantially major portion of the bottom of the charging bin; guide means constraining the pusher to rearward and forward motion across the bottom of the charging bin; and actuating means connected with the pusher to drive the same substantially entirely across the charging bin, both forwardly so that the pusher propels asphalt mix out of a front opening in the charging bin and rearwardly for withdrawal of the pusher from the charging bin through a rear opening therein.

Preferably the rear opening in the charging bin fits the pusher closely so that asphalt mix which rests on said top surface of the pusher is wiped therefrom as the pusher is rearwardly withdrawn from the charging bin. The actuating means preferably comprises a double-acting cylinder that is actuated by pressure fluid and is mounted behind the pusher.

BRIEF DESCRIPTION OF THE DRAWINGS

In the accompanying drawings, which illustrate what is now considered a preferred embodiment of the invention:

FIG. 5 is a view looking down on the clean-out device and showing the bucket elevator and its casing in transverse section; and FIG. 6 is a view in vertical section taken on the plane of the line 6—6 in FIG. 5.

DETAILED DESCRIPTION OF THE INVENTION

Figure 1:
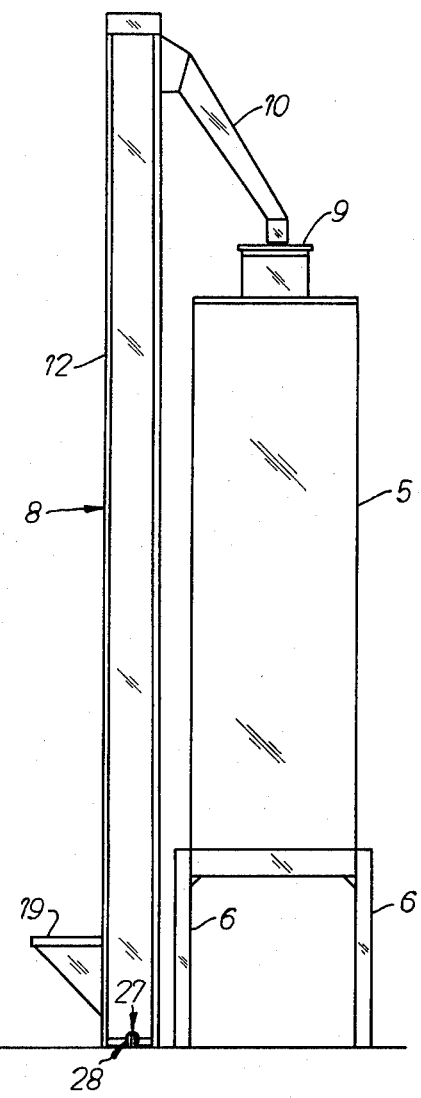
FIG. 1 is a more or less diagrammatic view in rear elevation of asphalt mix storage apparatus embodying the principles of this invention.
Figure 2:
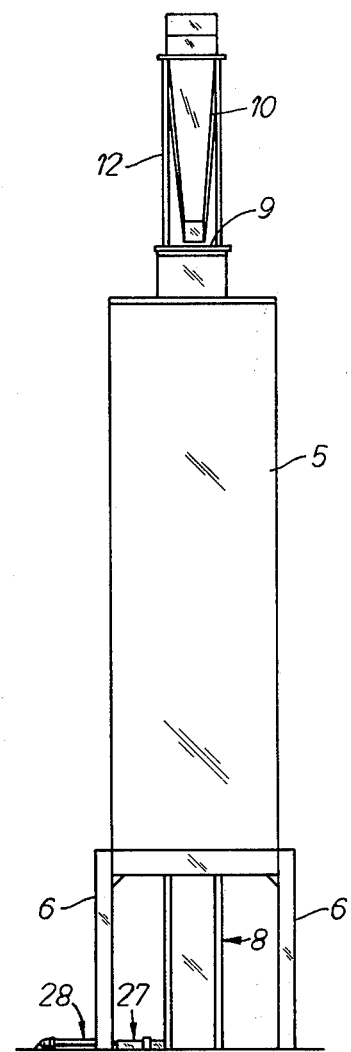
FIG. 2 shows the storage apparatus in side elevation.

Referring now to the accompanying drawings, the numeral 5 designates generally an asphalt mix storage bin in which asphalt concrete mix is temporarily stored during a period after it is mixed and until it is to be transported to a site of use. As is conventional, the storage bin 5 is thermally insulated to retain the heat of the mix while it is in storage and thus prevent the mix from hardening. As is also conventional, the storage bin is mounted on legs 6 so that a truck (not shown) can be driven under it to be loaded from an outlet in its bottom.

The asphalt mix is prepared in a conventional mixer (not shown), which may be a pug mill or drum mixer. From the mixer the material is delivered to a bucket elevator 8 by which it is raised to a level above that of a top inlet 9 in the storage bin 5. At the top of the bucket elevator 8 the material is discharged into an inclined chute 10 in which it flows by gravity into the storage bin inlet 9.

The bucket elevator 8 comprises a high, upright casing 12 of rectangular cross-section that extends up alongside the storage bin 5. Within the casing 12 is the operative mechanism of the elevator, which comprises an endless chain 14 that is trained around sprocket wheels 15 and has buckets 16 secured to it at regular intervals along its length. The sprocket wheels 15 are arranged to define two straight and parallel stretches 17 of the carrier 14, in one of which the buckets 16 move downwardly and in the other of which they move upwardly.

The lower sprocket wheels 15 are in a charging bin 18 that comprises the lowermost portion of the bucket elevator casing, sometimes referred to as the boot of the bucket elevator. A receiving chute 19 leads into the charging bin 18 from the mixing device so that the material issuing from the mixer is fed directly into the charging bin by gravity. The material normally accumulates there to a substantial depth, to be scooped up by the buckets 16 as they pass around the bottom sprocket wheels 15 and move towards the upwardly traveling carrier stretch.

It will be understood that there are conventional drive means (not shown) for imparting rotation to the lower sprockets and thus causing the endless carrier 14 to move in its orbit. As is also conventional (and not shown), the lower sprocket wheels 15 are arranged to be free for limited up and down motion but are biased downwardly so that a certain amount of lengthwise tension is maintained on the straight vertical stretches 17 of the endless carrier 14.

The lower portion of the bucket elevator casing 12, which defines the charging bin 18, has a pair of opposite upright side walls 21, 22 and opposite upright front and rear walls 23, 24. The side wall 21 is adjacent to the storage bin 5 and is thus at the discharge side of the bucket elevator, while the receiving chute 19 extends through the opposite side wall 22, which is thus at the charging side of the elevator. It will be noted that the straight stretches 17 of the carrier are adjacent to the side walls 21 and 22 while the front and rear walls 23 and 24 are adjacent to the ends of the transversely elongated buckets 16.

In order for the buckets 16 to be capable of scooping asphalt mix out of the charging bin 18, the material must be present therein to a level above the bottom of the orbit of the buckets. It can be seen that if mix is left in the charging bin to that depth, and is allowed to harden while the elevator is inoperative, the hardened material will impede movement of the buckets when the elevator is restarted, causing possible damage to the mechanism.

Figure 3:
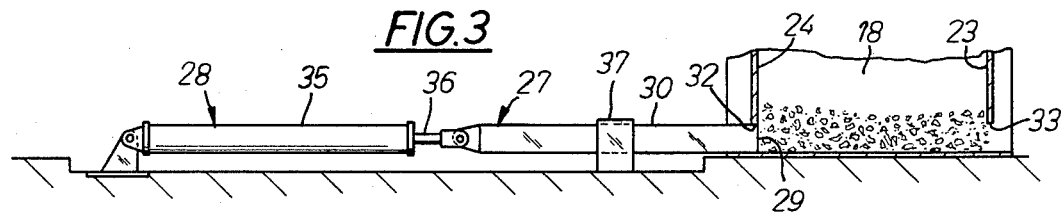
FIG. 3 is a view in side elevation on an enlarged scale showing the lower portion of the bucket elevator casing and the clean-out device of this invention in its retracted position.
Figure 4:
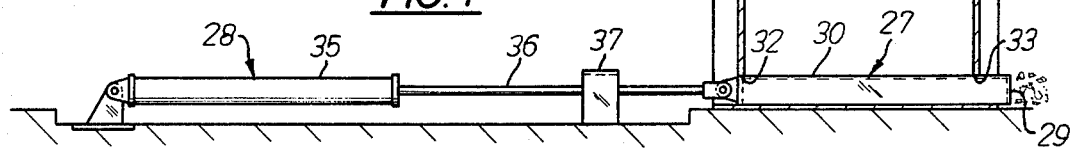
FIG. 4 is a view similar to FIG. 3 but showing the device in its extended position.

The present invention provides automatic means for removing asphalt mix from the charging bin 18, at least to such an extent as to bring the material down to a level at which it cannot interfere with the moving parts of the bucket elevator mechanism. According to the invention, material is pushed out of the bottom of the charging bin by means of a plunger-like ram or pusher 27 that is moved backward and forward across the bottom of the charging bin by means of an actuator 28. The pusher 27 is normally in a retracted position (shown in FIG. 3) wherein it is wholly outside the charging bin, at the rear side thereof, but it can be propelled forwardly from that position to an advanced position (FIG. 4) in which it extends across substantially the whole bottom of the charging bin.

The pusher 27 is of block-like configuration, being at least long enough to extend across the charging bin from its front wall 23 to its rear wall 24 and being wide enough to extend across at least the major portion of the distance between the side walls 21, 22 of the charging bin. The pusher has an upright front surface 29 and a preferably flat top surface 30 which extends rearwardly from that front surface for the full length of the pusher and entirely across its width. As the pusher is moved forwardly from its retracted position by the actuator 28, it enters the charging bin 18 through a closely fitting opening 32 in the bottom of the rear wall 24 of that bin. With continued forward motion across the bottom of the charging bin the pusher acts like a ram to drive asphalt mix ahead of it and out of the charging bin through an opening 33 in the bottom of the front wall 23. It will be understood that the openings 32 and 33 are normally closed by suitable doors (not shown).

As the pusher 27 is moved into the charging bin, it of course displaces material only at the bottom of that bin, and the remainder of the material in the charging bin rests on the flat top surface 30 of the pusher. As the actuator 28 draws the pusher back to its retracted position, the top surface 30 of the pusher is wiped by the rear wall of the charging bin, owing to the close fit of the pusher in the rear wall opening 32. Behind the retreating pusher, material then falls to the bottom of the charging bin. Two or more strokes of the pusher may be necessary to remove enough asphalt mix from the bottom of the charging bin so that none of the mix will be in contact with movable parts of the bucket elevator, and preferably the pusher is always operated through enough strokes to clean out the charging bin completely, so that subsequently the pusher will not have to work against hardened mix.

The actuator 28 for the pusher 27 is preferably a double-acting jack cylinder which can be either hydraulically or pneumatically energized and which has its cylinder 35 fixed behind the pusher and its piston rod 36 connected to the rear of the pusher.

The pusher is guided in its backward and forward motion by a bail-like guide member 37 that is fixed outside the charging bin, a distance to the rear of its rear wall 24 but in forwardly spaced relation to the actuator cylinder 35. The guide member 37 closely embraces the top and side surfaces of the pusher to constrain it to backward and forward motion at times when it is outside the charging bin or only partway in it. Within the charging bin, extending along the opposite sides of it, are guide rails 39 that engage the pusher along its opposite sides and overlie the marginal side portions of its top surface 30 to afford guidance to the pusher when it is within the charging bin.

It will be evident that the pusher could have a different orientation than the preferred one here illustrated, so that it could expel asphalt mix out of the bottom of the charging bin 18 in a direction towards or away from the storage bin 5. In that case, however, the legs 6 on which the storage bin is mounted might interfere with scooping up asphalt mix expelled by the pusher, or else the actuator 18 might interfere with movement of trucks to and from their loading positions beneath the storage bin. With the illustrated orientation, the pusher expels asphalt mix into an area from which it can be readily picked up with an end loader.

From the foregoing description taken with the accompanying drawings it will be apparent that this invention provides simple, efficient and inexpensive means for automatically effecting the required daily clean-out of a bucket elevator charging bin.

I Claim:

1. In combination with a bucket elevator for asphalt mix storage apparatus, said elevator comprising a charging bin into which asphalt mix is fed, an endless carrier upon which there are buckets, and means for causing the carrier to move in an orbit such that the buckets are carried through the charging bin to scoop asphalt mix therefrom and then upward to a level from which the mix can be filled into an inlet in the top of a storage bin adjacent to the elevator, clean-out means for removing asphalt mix from the charging bin upon shutdown of the elevator so that hardened asphalt mix in the charging bin will not interfere with operation of the elevator upon its subsequent restarting, said clean-out means comprising:
   A. a pusher having
      (1) a substantially upright front pushing surface,
      (2) a top surface which extends rearwardly from said front surface and which is at a height to pass readily under the carrier and buckets, and
      (3) a length and width to extend across a substantially major portion of the bottom of the charging bin;
   B. guide means constraining the pusher to rearward and forward motion across the bottom of the charging bin; and
   C. actuating means connected with the pusher to drive the same substantially entirely across the charging bin, both forwardly so that the pusher propels asphalt mix out of a front opening in the charging bin and rearwardly for withdrawal of the pusher from the charging bin through a rear opening therein.

2. The combination of claim 1 wherein said storage bin is at one lateral side of the bucket elevator and the charging bin, and wherein said actuating means is spaced rearwardly from the charging bin and is behind the pusher, so that asphalt mix which the pusher expels through said front opening is readily accessible for removal.

3. The combination of claim 1 wherein said rear opening in the charging bin is of a size and shape to fit the pusher substantially closely so that asphalt mix which rests on said top surface of the pusher while it is in the charging bin remains therein as the pusher is rearwardly withdrawn therefrom.

4. The combination of claim 2 wherein said guide means comprises:
   (1) a bail fixed between the charging bin and the actuating means and through which the pusher passes in moving into and out of the charging bin, and
   (2) rail means extending forwardly and rearwardly along opposite sides of the charging bin and by which opposite side portions of the pusher are guidingly engaged while the pusher is in the charging bin.

5. In asphalt mix storage apparatus comprising a storage bin having an inlet in its top, a charging bin which asphalt mix is initially received and which has opposite upright side walls and opposite upright front and rear walls, and a bucket elevator by which asphalt mix is filled into said inlet from said charging bin and which comprises an endless carrier having buckets at spaced intervals therealong and means constraining said carrier to move in an orbit whereby the buckets are passed through the charging bin to scoop asphalt mix therefrom and are then moved upwardly, clean-out means for preventing hardened asphalt ,ix in said charging bin from interfering with movement of the carrier and buckets after the bucket elevator has been inoperative for a time, said clean-out means comprising:
   A. A pusher movable forwardly to and rearwardly away from an advanced position in the bottom of said charging bin through a closely fitting opening in the bottom of said rear wall thereof, said pusher having
      (1) a width to extend across at least most of the distance between said side walls,
      (2) a length to extend across at least most of the distance between said front and rear walls,
      (3) a substantially upright front surface by which asphalt mix in the bottom portion of the charging bin is propelled out of an opening at the bottom of said front wall as the pusher moves to its said advanced position, and
      (4) a top surface extending rearwardly from said front surface upon which other asphalt mix in the charging bin can be supported while the pusher is in the charging bin and from which asphalt mix is wiped by said rear wall as the pusher moves away from its advanced position through said opening in the rear wall; and
   B. actuating means for moving said pusher forwardly to said advanced position and rearwardly to a retracted position in which said front surface on the pusher is spaced a substantial distance from said front wall of the charging bin.

6. The ashphalt mix storage apparatus of claim 5 wherein said actuating means comprises a double-acting pressure fluid cylinder mounted behind the pusher.

* * * * *